(12) United States Patent
Lee

(10) Patent No.: US 7,882,246 B2
(45) Date of Patent: Feb. 1, 2011

(54) METHOD FOR UPDATING CONNECTION PROFILE IN CONTENT DELIVERY SERVICE

(75) Inventor: Ji-Hye Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 12/358,380

(22) Filed: Jan. 23, 2009

(65) Prior Publication Data

US 2009/0254662 A1 Oct. 8, 2009

Related U.S. Application Data

(60) Provisional application No. 61/043,046, filed on Apr. 7, 2008, provisional application No. 61/049,776, filed on May 2, 2008.

(30) Foreign Application Priority Data

Aug. 29, 2008 (KR) ...................... 10-2008-0084969

(51) Int. Cl.
*G06F 15/16* (2006.01)
(52) U.S. Cl. ...................... 709/227; 709/228
(58) Field of Classification Search ........................ None
See application file for complete search history.

(56) References Cited

U.S. PATENT DOCUMENTS

| | | | |
|---|---|---|---|
| 6,603,969 B1 * | 8/2003 | Vuoristo et al. ............. | 455/433 |
| 7,206,790 B2 * | 4/2007 | Kodama ............................ | 1/1 |
| 7,386,880 B2 * | 6/2008 | Wesinger et al. ............... | 726/11 |
| 7,469,139 B2 * | 12/2008 | van de Groenendaal ..... | 455/411 |
| 7,673,048 B1 * | 3/2010 | O'Toole et al. ............. | 709/226 |
| 2006/0271626 A1 * | 11/2006 | Tidwell et al. ............... | 709/204 |
| 2007/0147324 A1 * | 6/2007 | McGary ...................... | 370/338 |
| 2007/0286159 A1 * | 12/2007 | Preiss et al. .................. | 370/352 |
| 2008/0039132 A1 * | 2/2008 | Delibie et al. ............. | 455/552.1 |
| 2008/0181187 A1 * | 7/2008 | Scott et al. ................... | 370/338 |
| 2009/0276667 A1 * | 11/2009 | Dopson et al. ................. | 714/48 |
| 2009/0300722 A1 * | 12/2009 | Haverinen et al. ............. | 726/4 |
| 2009/0318173 A1 * | 12/2009 | Ghahramani ................. | 455/466 |
| 2010/0082561 A1 * | 4/2010 | Rauber ........................ | 707/695 |
| 2010/0121879 A1 * | 5/2010 | Greenberg ................... | 707/779 |
| 2010/0131654 A1 * | 5/2010 | Malakapalli et al. ......... | 709/227 |
| 2010/0191692 A1 * | 7/2010 | Gassewitz et al. ............. | 706/47 |

FOREIGN PATENT DOCUMENTS

| | | |
|---|---|---|
| KR | 10-2001-0053861 | 7/2001 |
| KR | 10-2005-0085820 | 8/2005 |
| KR | 10-2006-0002196 | 1/2006 |
| KR | 10-0864582 B1 | 10/2008 |
| KR | 10-2009-0032699 | 4/2009 |

* cited by examiner

*Primary Examiner*—Bunjob Jaroenchonwanit
(74) *Attorney, Agent, or Firm*—Birch, Stewart, Kolasch & Birch, LLP

(57) ABSTRACT

A method for updating a connection profile in a content delivery service by a dynamic content delivery (DCD) terminal, comprises: receiving, from a server, a connection profile update message including a connection profile; transmitting, to the server, a connection profile update confirmation message in response to the reception; transmitting, to the server, a session deactivation request message based on the connection profile; and transmitting, to another server, a session activation request message base on the connection profile.

17 Claims, 6 Drawing Sheets

FIG. 4

Connection Profile
- DCD-3-connection-profile-name
- DCD-3-connection-profile
  - DCD-server-address
  - network-selection
  - proxy
  - data-connection-detail (structure)
    - apn (access point name)
    - auth-method
    - auth-username
    - auth-password
  - broadcast-profile (structure)
    - cell-broadcast-message-id
    - bcast-access-info (structure)
    - service-fragment-reference
    - access-fragment
    - sdp-description

METHOD FOR UPDATING CONNECTION PROFILE IN CONTENT DELIVERY SERVICE

RELATED APPLICATION

The present disclosure relates to subject matter contained in a provisional application No. 61/043,046, filed on Apr. 7, 2008, a provisional application No. 61/049,776, filed on May 2, 2008, and a priority Korean Application No. 10-2008-0084969, filed on Aug. 29, 2008, which are herein expressly incorporated by reference in its entirety.

BACKGROUND OF THE INVENTION

1. Field of the Invention

The present invention relates to a method for updating configuration information such as a connection profile.

2. Background of the Invention

In general, content delivery service is performed based on configuration information, for example, a network interface.

The content delivery service includes various types of services, and a dynamic content delivery (DCD) service has been recently proposed.

The DCD service is performed to deliver content to a terminal periodically or according to a user's request.

The DCD service includes a pull method for delivering content to a terminal according to a user's request, a push method for unilaterally delivering content to a terminal, a broadcast method for broadcasting content to a plurality of terminals, etc.

Referring to FIG. 1, the DCD service includes a DCD terminal 100, a content provider (or content providing server) 200, and a DCD server 300 (or Service Provider SP) for receiving the content from the content provider 200 and providing it to the DCD terminal 100 according to a user's configuration.

The DCD terminal 100 includes a DCD client 101, and a DCD enabled client application 102.

The DCD client 101 receives the content from the DCD server 300 through an interface therebetween.

The interface between the DCD client 101 and the DCD server 300 includes DCD-1 interface, DCD 2-interface, and DCD-3 interface.

The DCD-1 interface supports a service based on the PULL method, the DCD-2 interface supports a service based on the PUSH method, and the DCD-3 interface serves to transmit and receive a control signal, etc.

The DCD enabled client application 102 performs various functions by using content received from the DCD server 300, and includes various applications such as a browser and an RSS viewer.

The DCD enabled client application 102 includes an application profile corresponding to configuration information for the DCD service.

Hereinafter, the operation among the components of FIG. 1 will be explained.

The DCD enabled client application 102 of the DCD terminal 100 informs itself to the DCD client 101, and registers to the DCD client 101 so as to receive content from the DCD server 300. For the registration, the DCD enabled client application 102 delivers an application registration request message to the DCD client 101. Here, the application registration request message may include the application profile. And, the application registration request message may further include information such as a user's preference and personalization. This allows the DCD server 300 to deliver a channel guide about a user's interest channel (e.g., today weather) to the DCD terminal 100 based on the user's preference and personalization information.

The DCD client 101 registers to the DCD server 300. Here, the DCD client 101 delivers the application registration request message to the DCD server 300. The application registration request message may include the application profile. As aforementioned, the application registration request message may further include information such as a user's preference and personalization.

The content provider 200 generates a channel formed as a plurality of similar contents are grouped. The content provider 200 registers channel metadata, information about a plurality of channels that can be provided by itself, to the DCD server 300. Then, the content provider 200 provides the channel metadata to the DCD server 300.

The DCD server 300 makes a channel guide through the channel metadata by the plurality of content providers 200, and provides the channel guide to the DCD terminal 100.

The DCD enabled client application 102 of the DCD terminal 100 provides the channel guide to a user, thereby allowing the user to subscribe to interest channels. Once the user wants to subscribe to his or her interest channels, the DCD enabled client application 102 delivers the subscription request to the DCD server 300 through the DCD client 101. Then, the DCD server 300 delivers the subscription request to the content provider 200.

The content provider 200 delivers the channel metadata to the DCD server 300, and the DCD server 300 delivers the metadata to the DCD enabled client application 102 through the DCD client 101. Here, the content provider 200 may further deliver content metadata about content inside the channels to the DCD server 300.

The channel metadata is stored at a lower hierarchy of the application profile of the corresponding DCD enabled client application 102 that plays back content of the subscribed interest channel.

FIG. 2 shows details about the application profile and channel profile, and a relation therebetween.

Referring to FIG. 2, the channel metadata is located at a lower hierarchy of the application profile. And, the content metadata is located at a lower hierarchy of the channel metadata.

The application profile includes an application-id parameter indicating an ID of a corresponding application, an application-description parameter indicating information of an application (e.g., application name), a channel-discovery-notification parameter indicating whether to notify a new channel or not, a DCD-3-connection-profile-name parameter indicating a name of configuration information about the DCD-3 interface such as a connection profile, and a DCD-3-connection-profile parameter including the configuration information about the DCD-3 interface such as the connection profile. As aforementioned, the connection profile is located at a lower hierarchy of the application profile. Accordingly, when the DCD enabled client application 102 registers to the DCD client 101 so as to inform itself and to receive content from the DCD server 300, the connection profile is delivered to the DCD client 101 from the DCD enabled client application 102 with being included in the application profile. Once receiving the connection profile, the DCD client 101 checks validity of the connection profile, activates a connection with the DCD server 300, and sets a session with the DCD server 300.

The DCD-3-connection-profile parameter includes the connection profile. Here, the connection profile includes an address of the DCD server, information about a proxy server, etc. The DCD client 101 performs a connection with the DCD server 300 through the DCD-3 interface by using the connection profile inside the application profile.

The content metadata includes a connection profile about the DCD-1 interface, and a connection profile about the DCD-2 interface.

The connection profile about the DCD-1 interface is included in the application profile. The application profile is generated when a manufacturer presents out a terminal installed with the application, or when the manufacturer installs a new application. This may cause change of the connection profile to be impossible, and thus service can not be performed when the DCD server designated in the connection profile is mal-operated. Furthermore, when a plurality of DCD terminals have the same connection profile, they are connected to the same DCD server. This may cause an overload.

When receiving the channel metadata by subscribing to the channel, the connection profile about the DCD-2 is received together with the channel metadata. The connection profile can be received only when subscribing to the channel, but can not be changed later,

SUMMARY OF THE INVENTION

Therefore, one object of the present invention is to dynamically change the connection profile.

Another object of the present invention is to perform connection to another server when one server is abnormally operated, or to implement load balancing.

In order to achieve these objects, the present invention provides a protocol capable of dynamically changing configuration information, e.g., a connection profile.

In order to achieve these objects, the present invention also provides a method for updating preset sessions based on a changed connection profile.

To achieve these and other advantages and in accordance with the purpose of the present invention, as embodied and broadly described herein, there is provided a method for updating a connection profile in a content delivery service, comprising: receiving, from a server, a connection profile update message including a connection profile; transmitting, to the server, a connection profile update confirmation message in response to the reception; transmitting, to the server, a session deactivation request message based on the connection profile; and transmitting, to another server, a session activation request message base on the connection profile.

The connection profile may be a connection profile for a DCD-3 interface.

The connection profile update message may be a ConnectionProfileUpdate message, and the connection profile update confirmation message may be a ConnectionProfileConfirmation message. And, the session deactivation request message may be a ClientDeactivationRequest message.

The method for updating a connection profile in a content delivery service may further comprise receiving, from the server, a session deactivation response message. The session deactivation response message may be a ClientDeactivationResponse message.

The method for updating a connection profile in a content delivery service may further comprise receiving, from said another server, a session activation response message.

The session activation request message may be a ClientActivationRequest message, and the session activation response message may be a ClientActivationResponse message.

To achieve these and other advantages and in accordance with the purpose of the present invention, as embodied and broadly described herein, there is also provided a terminal for a content delivery service, comprising: a transceiver (transmitter/receiver); and a dynamic content delivery (DCD) client for updating preset connection profiles based on a connection profile included in a connection profile update message when receiving the connection profile update message from the server through the transceiver, transmitting a connection profile update confirmation message to the server, transmitting a session deactivation request message to the server through the transceiver based on the connection profile, and transmitting a session activation request message to another server based on the connection profile.

In the present invention, a configuration file, e.g., configuration information about a DCD-3 interface is dynamically changed. This may allow a DCD server which is in a mal-operation state to be replaced by another DCD server, and enable load balancing.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is an exemplary view showing configuration information, i.e., a connection profile;

DETAILED DESCRIPTION OF THE INVENTION

Figure 1:
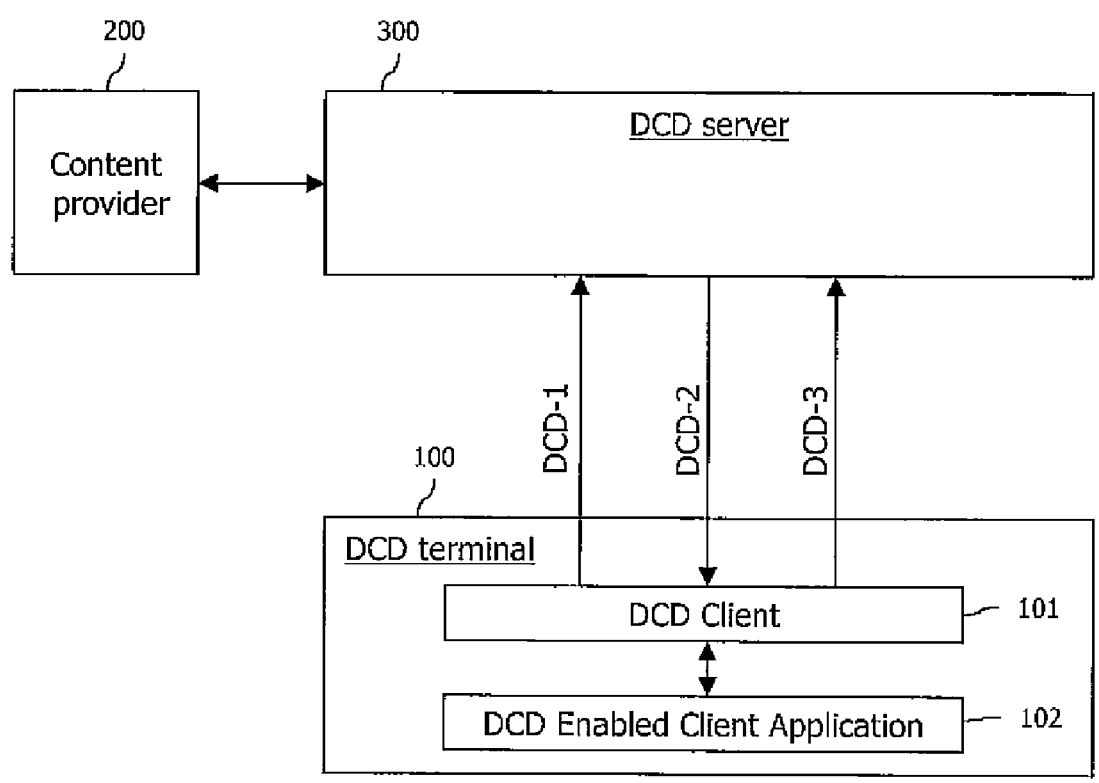
FIG. 1 is a block diagram showing a Dynamic Content Delivery (DCD) system in accordance with the conventional art.

Description will now be given in detail of the present invention, with reference to the accompanying drawings.

The present invention is applied to a content delivery service, e.g., a dynamic content delivery (DCD) service. However, the present invention is not limited to this, but may be applied to all content delivery services to which the techniques of the present invention can be applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Firstly, terms used in the present invention will be explained in brief.

Activation

In a content delivery system based on a point-to-point method such as a PUSH method or a PULL method, it is a first task to connect a DCD terminal and a DCD server with each other. This is referred to as 'Activation'.

Session

A result of the activation is referred to as 'Session'. In order to set the session, the DCD terminal has to deliver a user's information and authentication-related information to the DCD server, and requests the activation. Then, the DCD server delivers a session ID to the DCD terminal, thereby performing the activation.

The session may be considered as a substantial start of a DCD service. Through the session, changes of a user's channel subscription, channel guide information, a user's personalization, and customization information are performed.

In a content delivery system based on a broadcast method, channel access information (channel access point information) or Session Description Protocol (SDP) is delivered from the DCD server to the DCD terminal. And, the DCD terminal accesses interest channels by using the channel access information or the SDP, thereby receiving content.

Hereinafter, preferred embodiments of the present invention will be explained in more detail with reference to the attached drawings. Similar reference numerals are used to similar components in each drawing. When it is judged that detailed explanation about well-known techniques relating to the present invention causes the present invention to be unclear, the detailed explanation will be omitted.

Though the present invention may be variously modified and have several embodiments, specific embodiments will be shown in drawings and be explained in detail. However, the present invention may not be limited thereto, but it is intended that the present invention cover all modifications, equivalents, and alternatives within the scope of the claims.

Figure 2:
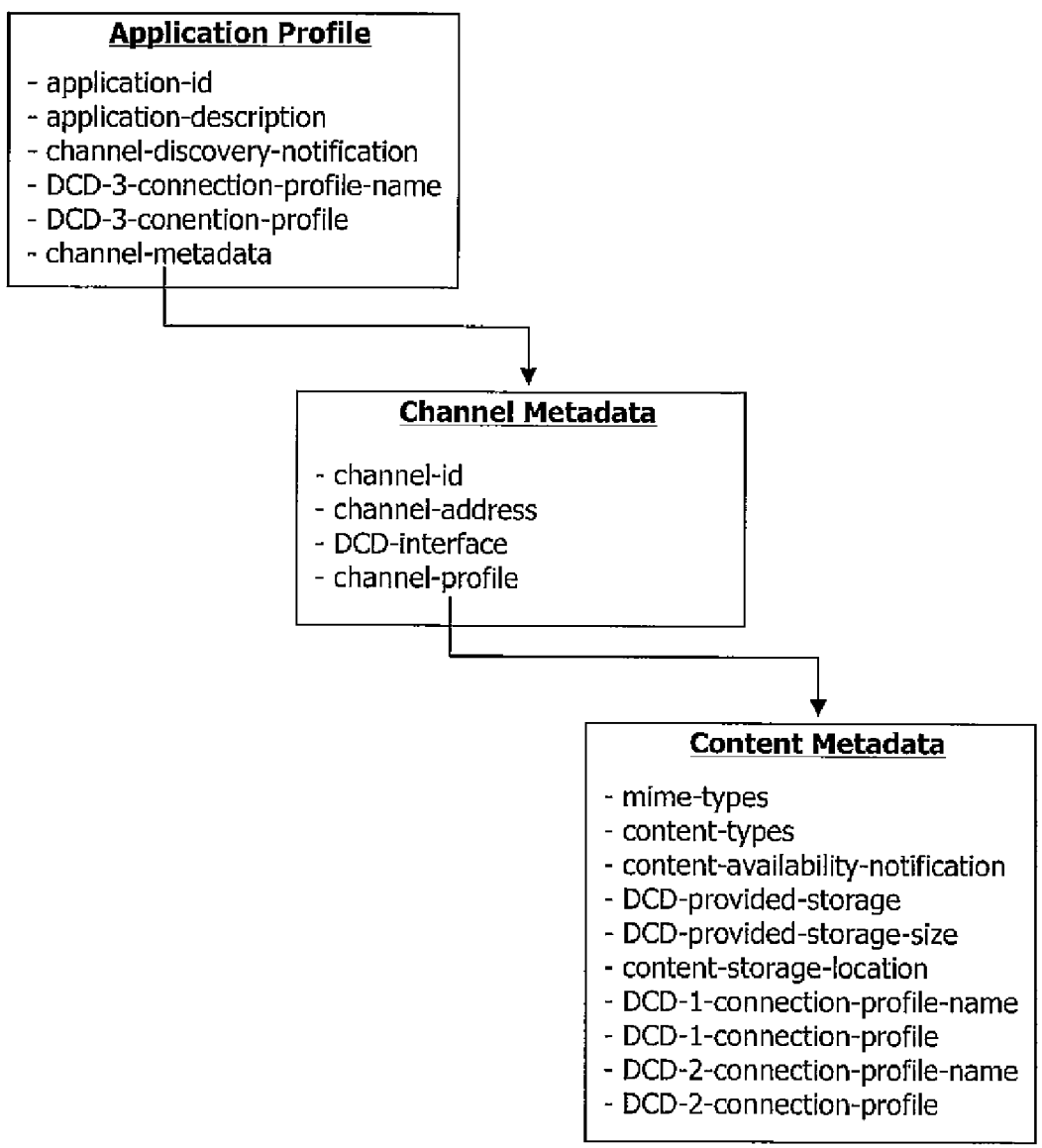
FIG. 2 is a view showing an application profile and a channel profile.

In FIGS. 3 to 6 of the present invention, detailed constructions of the DCD terminal 100, the content provider 200, and the DCD server 300 are not disclosed. However, the detailed configurations of the DCD terminal 100, the content provider 200, and the DCD server 300 in FIGS. 3 to 6 should be explained based on those of components shown in FIGS. 1 and 2.

Figure 3:
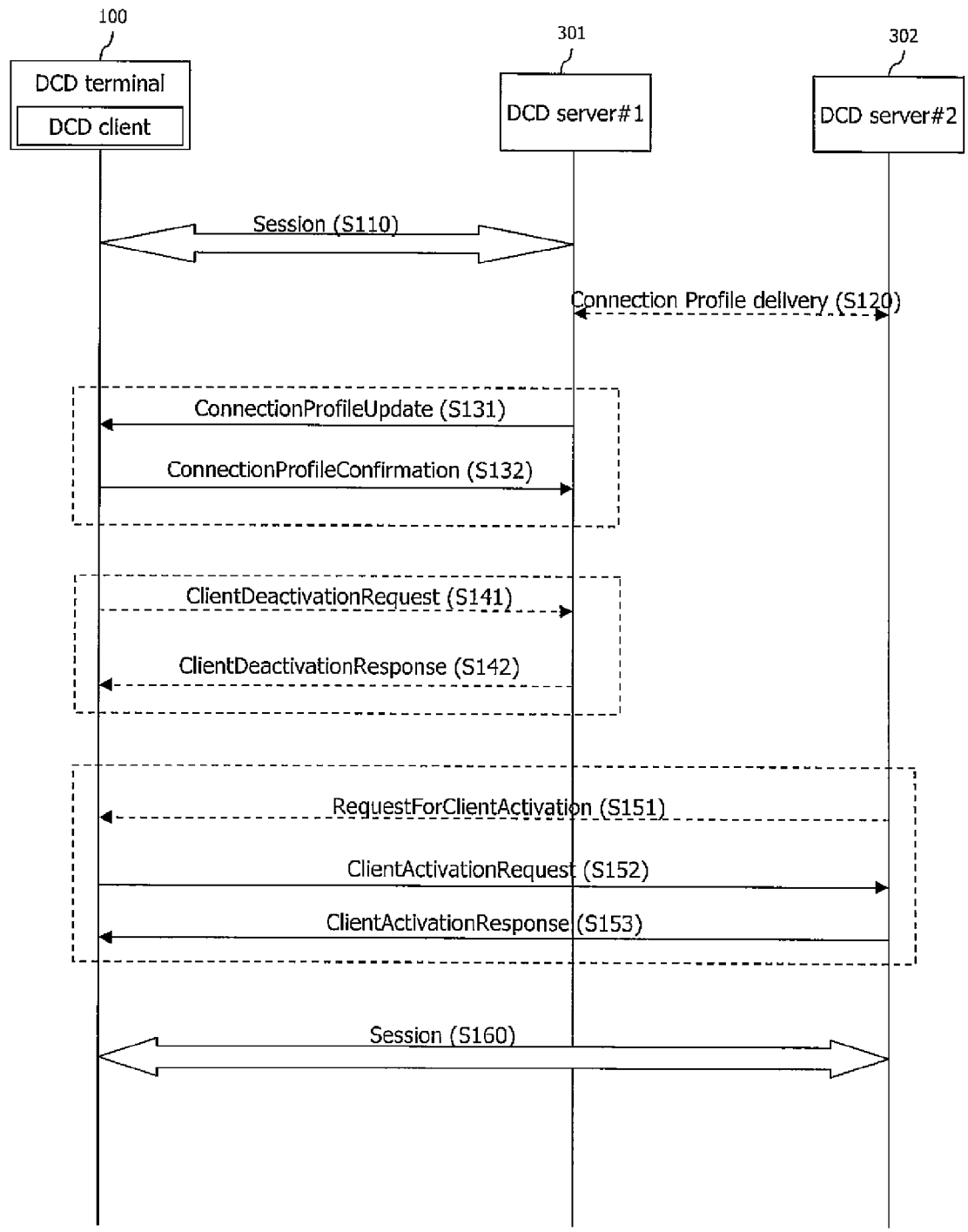
FIG. 3 is an exemplary view showing a flowchart of a method for updating configuration information according to the present invention.

FIG. 3 is an exemplary view showing a flowchart of a method for updating configuration information according to the present invention, and FIG. 4 is an exemplary view showing configuration information, i.e., a connection profile.

As shown in FIG. 3, a connection profile inside the DCD terminal 100 may be updated by the DCD server 300 if necessary.

Here, the connection profile indicates a series of parameters about communication between the DCD terminal 100 and the DCD server 300 through an interface. As aforementioned, the connection profile is located at a lower hierarchy of the application profile. As shown in FIG. 4, the connection profile includes a parameter about an address of a server, a parameter about a proxy, detailed configuration about data connection (e.g., data connection details), and broadcast-related configuration. The connection profile will be later explained with reference to FIG. 4.

In order to update the connection profile, the present invention provides a protocol composed of a connection profile update message, and a connection profile update confirmation message.

The present invention also provides a method capable of transmitting a connection profile about a changed DCD server to a DCD terminal when one DCD server which is in a service state is changed to another DCD server due to mal-operation or for load balancing, capable of terminating a session with the previous DCD server, and capable of setting a session with the new DCD server.

More concretely, the DCD terminal 100 sets a session with a first DCD server 301, and receives contents (S110). Here, the session may be set through the aforementioned DCD-1 interface, or the DCD-2 interface, or the DCD-3 interface.

Then, the first DCD server 301 judges whether update, deletion, or addition of configuration information about the interface, i.e., the connection profile are required.

The update of the connection profile is required when an address of the first DCD server 301 is changed, or information of a proxy server is changed, etc. When information is changed, the first DCD server 301 generates a connection profile. Examples of the connection profile will be explained with reference to FIG. 4.

The update of the connection profile is required when the first DCD server 301 which is in a mal-operation state is to be replaced by another DCD server for load balancing. In the case that a service is performed by a second DCD server 302 not by the first DCD server 301, the first DCD server 301 receives a connection profile from the second DCD server 302 (S120).

Then, the first DCD server 301 delivers a connection profile update message to the DCD terminal 100 (S131). Here, the connection profile update message includes an updated connection profile. In the case that deletion of a connection profile inside the DCD terminal 100 is required, the first DCD server 301 includes a connection profile having no element or parameter (or attribute) in the connection profile update message. In the case that deletion of a connection profile inside the DCD terminal 100 is required, the first DCD server 301 may include only a name of a connection profile in the connection profile update message.

The changed connection profile may be a connection profile generated by the first DCD server 301, or may be a connection profile received from the second DCD server 302. And, the connection profile may be a connection profile for the DCD-1 interface, or the DCD-2 interface, or the DCD-3 interface. Examples of the connection profile will be later explained with reference to FIG. 4.

Once receiving the connection profile update message, the DCD client 101 of the DCD terminal 100 delivers a connection profile update confirmation message to the first DCD server 302 (S132).

Then, the DCD client 101 of the DCD terminal 100 checks the received connection profile inside the connection profile update message.

Here, when the connection profile inside the connection profile update message includes no element, the DCD client 101 of the DCD terminal 100 deletes the preset connection profile. In the case that only a name of the connection profile exists in the connection profile update message, the DCD client 101 of the DCD terminal 100 deletes the preset connection profile corresponding to the name.

However, when the connection profile inside the connection profile update message includes a changed element or parameter, the DCD client 101 of the DCD terminal 100 updates the preset connection profile. Here, the process of checking the received connection profile and updating the preset connection profile may be executed after S131 and before S132, or after S141 or S142.

More concretely, when the received connection profile is a connection profile about the DCD-3 interface, the DCD client 101 of the DCD terminal 100 delivers the received connection profile to the DCD enabled client application 102. And, the DCD enabled client application 102 locates the received connection profile at a lower hierarchy of the application profile. When the received connection profile is a connection profile about the DCD-1 interface or the DCD-2 interface, the DCD client 101 of the DCD terminal 100 locates the received connection profile at a lower hierarchy of the content metadata.

Since the first DCD server 301 is replaced by the second DCD server 302 for service, when the DCD client 101 of the DCD terminal 100 is to deactivate the preset session with the first DCD server 301, it delivers a session deactivation request message, e.g., a client deactivation request message, to the first DCD server 301 (S141). When the DCD client 101 of the DCD terminal 100 is to update the preset session with the first DCD server 301 based on the new Content Profile, it delivers the session deactivation request message to the first DCD server 301. In the case that content of other channels is to be continuously received through the preset session, the session need not be deactivated. Accordingly, the DCD client 101 of the DCD terminal 100 may not deliver the session deactivation request message to the first DCD server 301.

The first DCD server 301 delivers a session deactivation response message, e.g., a Client Deactivation Response message, to the DCD terminal 100 (S142).

When the first DCD server 301 is replaced by the second DCD server 302 for service, the second DCD server 302 delivers a session triggered message for setting a session, e.g., a Request For client Activation message, to the DCD terminal 100 (S151). Here, the session triggered message may not be delivered.

When there is not the existing session between the DCD client 101 of the DCD terminal 100 and the second DCD server 302, the DCD client 101 of the DCD terminal 100 delivers a session activation request message for setting a session, e.g., a client Activation Request message, to the second DCD server 302 (S152).

The second DCD server 302 delivers a session activation response message, e.g., a client Activation Response message, to the DCD terminal 100.

Then, a session between the DCD terminal 100 and the second DCD server 302 is set, and the second DCD server 302 provides content to the DCD terminal 100 through the session.

FIG. 4 shows an example of a connection profile. The connection profile is a connection profile about the DCD-3 interface, and includes a DCD-3-connection-profile-name parameter and a DCD-3-connection-profile parameter. The DCD-3-connection-profile-name parameter indicates a name of the connection profile.

The DCD-3-connection-profile parameter includes configuration information, more concretely, a DCD-server-address parameter, a network-selection parameter, a proxy parameter, a data-connection-detail parameter, and a broadcast-profile parameter.

The DCD-server-address parameter designates an address of the DCD server, and the network-selection parameter designates which network is to be selected for access. And, the proxy parameter designates an address or a name of a proxy.

The data-connection-detail parameter includes an access point name (apn) parameter, an auth-method parameter, an auth-username parameter, and an auth-password parameter at a lower hierarchy thereof. The 'apn' parameter designates an access point name used to set data connection, and the auth-method parameter designates an authentication method for an interface. The auth-username parameter designates a user name for authentication through a selected authentication method. And, the auth-password parameter designates a password for authentication.

The broadcast-profile parameter includes a cell-broadcast-message-id parameter, a bcast-access-info parameter, a service-fragment-reference parameter, an access-fragment parameter, an sdp-description parameter at a lower hierarchy thereof. The cell-broadcast-message-id parameter indicates an identifier of a message (The Cell Broadcast Service message Identifier, logical Cell Broadcast Service channel, from which the DCD Client should expect DCD-3 interface data delivered via Cell Broadcast Service). The bcast-access-info parameter designates connection information to be delivered by using broadcast (OMA BCAST specific connection details, e.g., multicast IP, port, and TSI, for file delivery session over which the DCD Client should expect DCD-3 interface data to be delivered via OMA BCAST). The service-fragment-reference parameter designates URI matching (URI matching the "id" attribute of the OMA BSCAST service associated with the DCD-3 interface). And, the access-fragment parameter s includes access information (complete OMA BCAST Service Guide "access" fragment as described in Section 5.1.2.47 of (BCAST-TS_service_Guide) containing access information for the file delivery session associated with the DCD-3 interface). And, the sdp-description parameter designates SDP that describes a connection parameter.

As aforementioned, it is configured that the connection profile inside the DCD terminal 100 can be updated by the DCD server 300 if necessary. This may allow one DCD server which is in a mal-operation state to be replaced by another DCD server, and implement load balancing.

Figure 5:
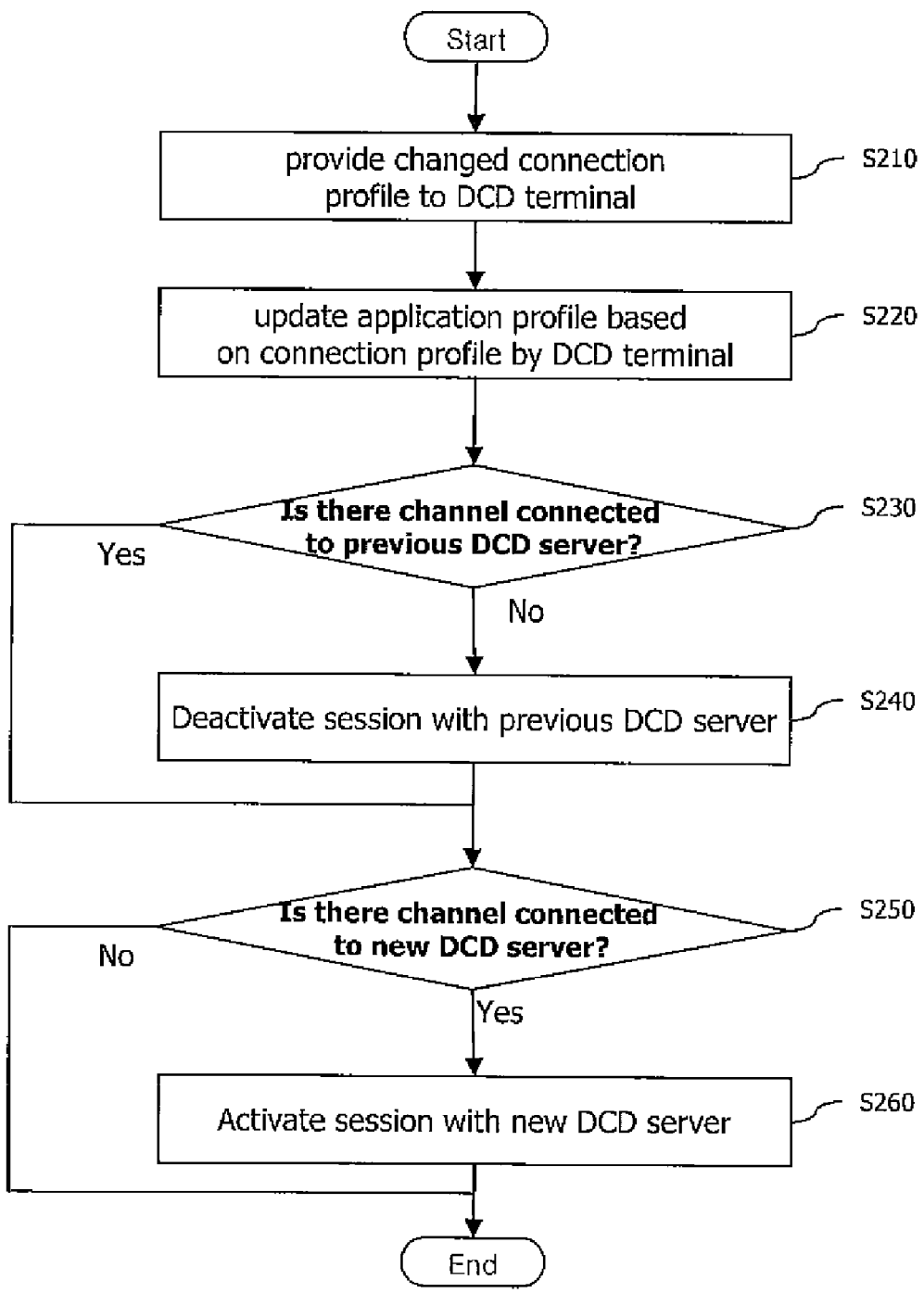
FIG. 5 is a flowchart showing a method for updating configuration information according to the present invention.

FIG. 5 is a flowchart showing a method for updating configuration information according to the present invention.

The present invention also provides a method capable of delivering a connection profile about a changed DCD server to a DCD terminal when one DCD server which is in a service state is changed to another DCD server due to mal-operation or for load balancing, capable of terminating a session with the previous DCD server, and capable of setting a session with the new DCD server. The method for updating configuration information according to the present invention will be explained in more detail.

Firstly, the first DCD server 301 which is performing a service provides a changed connection profile to the DCD terminal 100 (S210).

Then, the DCD terminal 100 stores the connection profile (S220). More concretely, when the connection profile is a connection profile about the DCD-3 interface, the DCD terminal 100 updates the application profile by using the connection profile (S220). Here, the connection profile includes a DCD-3-connection-profile-name parameter as shown in FIG. 4. Accordingly, the DCD terminal 100 searches a parameter inside an application profile consistent with a designated name in the parameter, and updates a corresponding application profile.

Then, the DCD terminal 100 judges whether there exists a channel provided through a session with the previous DCD server, i.e., the first DCD server lo 301 (S230). If there is no channel, the DCD terminal 100 deactivates the session (S240). However, if one or more channels exist, the DCD terminal 100 executes S250.

The DCD terminal 100 checks whether a session with a new DCD server, i.e., the second DCD server 302 is set, and whether there is a channel provided through the session (S250).

If there exists no session and no channel, the DCD terminal 100 establishes (or activates) a session with the second DCD server 302 (S260). However, if there exists a session and a channel, the DCD terminal 100 terminates the current step.

As aforementioned, the connection profile is flexibly changed in the present invention. Accordingly, when one DCD server is mal-operated, it can be replaced by another DCD server and load balancing is implemented.

The method of the present invention may be implemented by software, hardware, or combinations thereof. For instance, the method of the present invention may be implemented as codes or commands inside a software program that can be executed by a processor (e.g., a microprocessor inside a mobile terminal). And, the codes or commands may be stored in a storage medium (e.g., an inner memory of a mobile terminal, a flash memory, a hard disc, etc.). Hereinafter, with reference to FIG. 6, will be explained a case that the method of the present invention is implemented by hardware.

Figure 6:
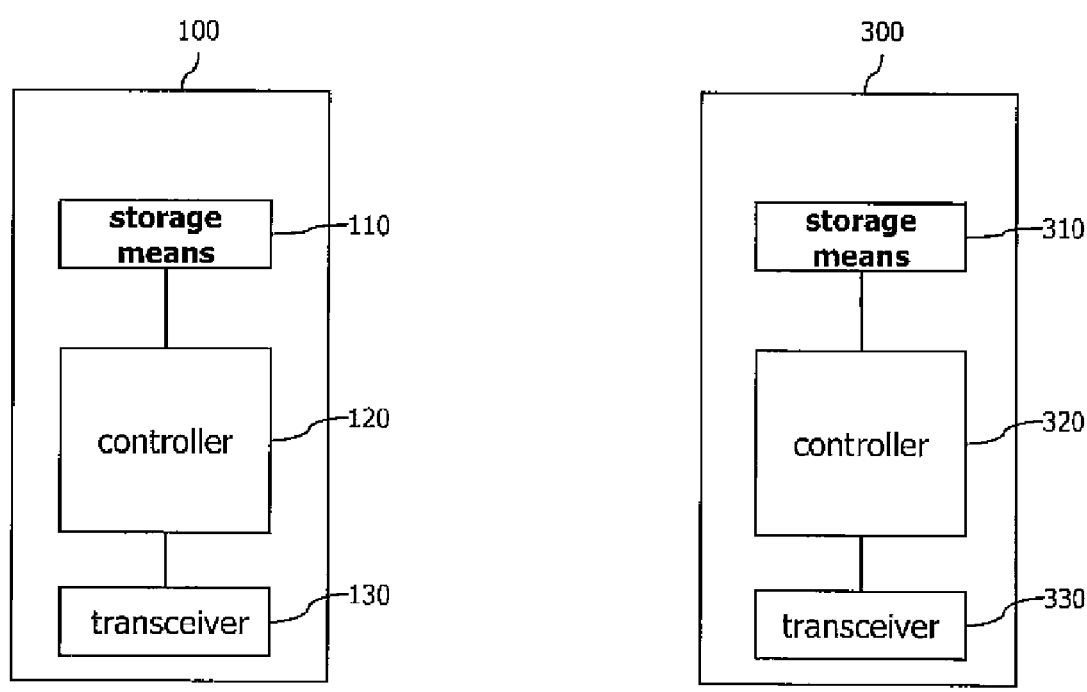
FIG. 6 is a block diagram showing a DCD server and a DCD client according to the present invention.

FIG. 6 is a block diagram showing configurations of a DCD server and a DCD client according to the present invention.

As aforementioned, the DCD server 300 may update, delete, or add the connection profile inside the DCD terminal 100. The DCD server 300 includes a storage means 310, a controller 320, and a transceiver 330.

The storage means 310 stores the connection profile, and the controller 32 updates the connection profile inside the storage means 310 if necessary.

The transceiver 330 delivers a connection profile Update message to the DCD terminal 100 so as to deliver the changed connection profile to the DCD terminal 100, and receives a connection profile update confirmation message from the DCD terminal 100. And, the transceiver 330 receives a Session Deactivation message from the DCD terminal 100 so as to deactivate a session, and delivers a session deactivation response message to the DCD terminal 100. The transceiver 330 receives a Session Activation message from the DCD terminal 100 so as to activate a session, and delivers a session activation response message to the DCD terminal 100.

The DCD terminal 100 may update the connection profile according to a request of the DCD server 300. The DCD terminal 100 includes a storage means 110, a controller 120, and a transceiver 130. Here, the DCD client 101 and the DCD enabled client application 102 may be programs stored in the storage means 110 and implemented by the controller 120.

The storage means 110 stores the connection profile. Once receiving an updated connection profile, the controller 120 updates the connection profile inside the storage means 110.

As aforementioned, the transceiver 130 may receive the connection profile and the connection profile Update Request message. The transceiver 130 may transmit/receive the aforementioned another message, and its detailed explanation will be omitted.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for updating a connection profile in a content delivery service, the method comprising:
   establishing, by a mobile terminal, a session for content delivery service with a server;
   receiving, by the mobile terminal from the server, a connection profile update message during the session;
   performing, by the mobile terminal, update procedures of a connection profile based on the connection profile update message;
   wherein the update procedures include:
   checking, by the mobile terminal, whether at least one of a name of the connection profile and a connection profile element exists in the received connection profile update message;
   when the name of the connection profile exists and the connection profile element is not present, deleting a pre-stored connection profile; and
   when the name of the connection profile and the connection profile element exist in the received connection profile update message, updating the pre-stored connection profile with the connection profile included in the received connection profile update message;
   checking whether the session is kept going to be used by a client application in the mobile terminal;
   transmitting, to the server, a session deactivation request message when the session is not required; and
   transmitting, to another server, a session activation request message according to the updated connection profile.

2. The method of claim 1, wherein the connection profile is configured for a DCD-3 interface.

3. The method of claim 1, wherein the connection profile update message is a ConnectionProfileUpdate message, wherein the session deactivation request message is a ClientDeactivationRequest message, and wherein the session activation request message is a ClientActivationRequest message.

4. The method of claim 1, further comprising receiving, from the server, a session deactivation response message,
wherein the session deactivation response message is a ClientDeactivationResponse message.

5. The method of claim 1, further comprising receiving, from said another server, a session activation response message,
wherein the session activation response message is a ClientActivationResponse message.

6. The method of claim 5, wherein the received connection profile includes an address of said another server.

7. The method of claim 1, wherein the connection profile includes:
a DCD-3-connection-profile-name parameter indicating a name of the connection profile; and
a DCD-3-connection-profile parameter including setting information.

8. The method of claim 1, wherein the connection profile is located below an application profile.

9. The method of claim 1, further comprising:
transmitting, to the server, a connection profile update confirmation message in response to the reception,
wherein the connection profile update confirmation message is a ConnectionProfileConfirmation message.

10. The method of claim 1, wherein the step of updating and the step of transmitting the connection profile update confirmation message can be performed in a reversed order.

11. The method of claim 1, wherein in the step of updating the connection profile, an element or a parameter of a stored connection profile is changed according to the connection profile inside the received connection profile update message.

12. The method of claim 1, wherein in the step of deleting the connection profile, if no element or no parameter is included in the connection profile inside the received connection profile update message, or if only a name of the connection profile exists, the pre-stored connection profile is deleted.

13. A terminal for a content delivery service, the terminal comprising:
a transceiver; and
a DCD (Dynamic Content Delivery) Client, configured to:
establish a session for content deliver service with a server;
receive, from the server, a connection profile update message during the session;
check whether a name of the connection profile exists in the received connection profile update message;
check whether a connection profile exists in the received connection profile update message;
when the name of the connection profile exists and the connection profile is not present, delete a pre-stored connection profile;
when the name of the connection profile and the connection profile exist in the received connection profile message, update the pre-stored connection profile with the connection profile included in the received connection profile update message;
check whether the session is kept going to be used by a client application in the mobile terminal;
transmit a session deactivation request message to the server through the transceiver when the session is not required; and
transmit a session activation request message to another server based on the updated connection profile.

14. The terminal of claim 13, wherein the connection profile update message is a ConnectionProfileUpdate message,
wherein the session deactivation request message is a ClientDeactivationRequest message, and
wherein the session activation request message is a ClientActivationRequest message.

15. The terminal of claim 13, wherein the DCD Client is further configured to receive a session deactivation response message, from the server through the transceiver, and a session activation response message from said another server,
wherein the session deactivation response message is a ClientDeactivationResponse message and the session activation response message is a ClientActivationResponse message, and
wherein the received connection profile comprises an address of said another server.

16. The terminal of claim 13, wherein the DCD client is further configured to:
transmit a connection profile update confirmation message to the server.

17. The terminal of claim 16,
wherein the connection profile update confirmation message is a ConnectionProfileConfirmation message.

* * * * *